(12) United States Patent
Burckhardt et al.

(10) Patent No.: US 8,299,201 B2
(45) Date of Patent: Oct. 30, 2012

(54) BISMUTH-CATALYZED POLYURETHANE COMPOSITION

(75) Inventors: Urs Burckhardt, Zurich (CH); Andreas Diener, Laupen (CH)

(73) Assignee: Sika Technology AG, Baar (CH)

( * ) Notice: Subject to any disclaimer, the term of this patent is extended or adjusted under 35 U.S.C. 154(b) by 781 days.

(21) Appl. No.: 10/529,894

(22) PCT Filed: Oct. 1, 2003

(86) PCT No.: PCT/EP03/10931
§ 371 (c)(1),
(2), (4) Date: Mar. 22, 2006

(87) PCT Pub. No.: WO2004/033519
PCT Pub. Date: Apr. 22, 2004

(65) Prior Publication Data
US 2006/0180274 A1  Aug. 17, 2006

(30) Foreign Application Priority Data

Oct. 8, 2002  (EP) .................................. 02022561

(51) Int. Cl.
*C08G 18/22* (2006.01)
(52) U.S. Cl. ................ 528/55; 528/73; 528/76; 528/80; 528/85; 560/25; 560/26; 560/115; 560/158; 560/330; 560/334; 156/331.1; 156/331.4; 156/331.7

(58) Field of Classification Search ............... 427/340, 427/385.5; 528/55, 58, 73, 48, 76, 80, 85; 560/25, 26, 334, 330, 115, 158; 156/331.1, 156/331.4, 331.7
See application file for complete search history.

(56) References Cited

U.S. PATENT DOCUMENTS

| | | | | |
|---|---|---|---|---|
| 3,635,906 A | * | 1/1972 | Jayawant | 528/58 |
| 3,993,685 A | * | 11/1976 | Zajacek et al. | 560/25 |
| 4,786,655 A | | 11/1988 | Grogler et al. | |
| 4,788,083 A | * | 11/1988 | Dammann et al. | 427/340 |
| 4,874,831 A | * | 10/1989 | House et al. | 528/48 |
| 5,059,671 A | * | 10/1991 | Taniguchi et al. | 528/49 |

FOREIGN PATENT DOCUMENTS

| | | |
|---|---|---|
| EP | 0 376 674 A1 | 7/1990 |
| EP | 0 761 705 A1 | 3/1997 |
| GB | 1 550 235 | 8/1979 |
| WO | WO 98/36007 A1 | 8/1998 |

* cited by examiner

*Primary Examiner* — Michael L Leonard
(74) *Attorney, Agent, or Firm* — Oliff & Berridge, PLC

(57) ABSTRACT

A one-component polyurethane composition includes at least one polyurethane prepolymer having terminal isocyanate groups which is prepared from at least one polyisocyanate and at least one polyol, and to at least one catalyst system which is obtainable from at least one bismuth compound and at least one aromatic nitrogen compound. The polyurethane composition may be used as an adhesive, sealant, coating or lining. Finally, catalysts for polyurethane compositions are disclosed which represent coordination compounds between bismuth and at least one aromatic nitrogen compound.

19 Claims, No Drawings

BISMUTH-CATALYZED POLYURETHANE COMPOSITION

TECHNICAL FIELD

The present invention relates to the field of polyurethane compositions and also catalysts for polyurethane compositions.

PRIOR ART

Polyurethane compositions have been used for a long time in many sectors. On the one hand, two-component polyurethane compositions are known, which comprise isocyanates in one component and in the second component an isocyanate-group-reactive compound such as an amine for example. Systems of this kind are distinguished by extremely rapid curing after the components have been mixed. On the other hand, one-component polyurethane compositions are also known. These polyurethane compositions comprise reactive isocyanates and cure under the influence of water. The water for this purpose originates normally from the air (atmospheric moisture). Governed by the diffusion of the water, the curing of these compositions following their application takes place significantly more slowly than in the case of two-component systems. This effect is very pronounced particularly under adverse application conditions, such as low temperature or low atmospheric moisture, for instance, and in such cases leads frequently to incomplete curing and hence to low ultimate mechanical strength in the composition. Governed by the slow curing reaction, moreover, a one-component composition has only a low early strength (the strength after a certain time, before the composition is fully cured), which rules out early loading of the material, which is something the user desires in many cases. To counter the problem of low curing rate, low early strength and incomplete curing, catalysts are normally employed. Catalysts suitable for one-component moisture-reactive polyurethane compositions often comprise tin compounds, frequently in combination with tertiary amines. Tin catalysts of this kind, however, have recently come under increasing pressure from users on account of toxicological concerns. Accordingly there is an increasing demand for more toxicologically favorable alternatives to the tin catalysts.

Bismuth catalysts have a far lower acute toxicity than the aforementioned tin catalysts and from a user standpoint are therefore given distinct preference over the latter. Examples of bismuth catalysts known for polyurethane compositions include bismuth carboxylates, e.g., bismuth octoate, as mentioned in WO 98/36007. However, the catalytic activity of bismuth compounds in respect of the isocyanate/water reaction is much lower than that of tin catalysts. The high catalyst dose needed for a sufficient cure rate means, however, that polyurethane compositions comprising such bismuth carboxylates do not remain usable over the entire shelf-life period required by the user, generally several months up to one or two years, since the isocyanate groups in the composition undergo reactions under the effect of the bismuth catalyst, even in the absence of water. The inadequate storage stability of a composition of this kind is manifested in practice in a steadily progressing increase in viscosity over the storage period, which is accompanied by an increasing deterioration in the application properties of said composition, to the point where it loses its capacity for application.

Existing one-component polyurethane compositions which both are stable on storage and cure rapidly with water or atmospheric moisture often, furthermore, have weaknesses in respect of their adhesion properties on paints such as are used in automaking and are therefore known to the skilled worker as "automotive paints". Adhesion to the newer generation of automotive paints in particular is often impossible to achieve adequately with moisture-curing one-component polyurethane adhesives. In cases where such paints are baked a multiplicity of times it is particularly difficult to achieve effective adhesion of the adhesive to the substrate, and also to maintain such adhesion over the long term.

DESCRIPTION OF THE INVENTION

The object of this invention was to provide a moisture-curing one-component polyurethane composition which on the one hand is sufficiently stable on storage in the absence of water and which on the other hand cures rapidly and fully following its application, while allowing a sufficiently long open time, and has a high early strength. The composition ought further to possess effective adhesion properties to automotive paints, especially multiply baked automotive paints.

Surprisingly, a moisture-curing one-component polyurethane composition having the desired properties has now been found. The described composition comprises a catalyst system which is composed of a bismuth compound and at least one aromatic nitrogen compound. The described composition on the one hand is extremely stable on storage in the absence of water and on the other hand, following its application, possesses high early strength and cures rapidly and fully. It has good processing properties and, furthermore, very good adhesion properties to automotive paints, and particularly to those automotive paints which have been baked a multiplicity of times. The described composition is suitable for use as an adhesive, sealant, coating or lining.

Way Of Performing The Invention

The present invention relates to one-component polyurethane compositions which comprise at least one polyurethane polymer having terminal isocyanate groups, which is prepared from at least one polyisocyanate and at least one polyol, and at least one catalyst system which is obtainable from at least one bismuth compound and at least one aromatic nitrogen compound.

The prefix "poly" in "polyol" and "polyisocyanate" constitutes a description, here and below, of the fact that the number of respective functional groups per molecule is two or more.

By an "aromatic nitrogen compound" is meant, in the entirety of the present document, an aromatic compound which contains at least one nitrogen atom that is part of the aromatic system, and which is also known to the skilled worker as a nitrogen heteroaromatic.

The polyurethane prepolymer is prepared from at least one polyol and at least one polyisocyanate. The reaction of the polyol with a polyisocyanate may entail reacting the polyol and the polyisocyanate by customary processes, at temperatures for example of 50 to 100° C., with the use where appropriate of suitable catalysts and/or plasticizers and/or solvents that are not reactive with isocyanates under the chosen reaction conditions, the polyisocyanate beING used in a stoichiometric excess. The reaction product formed is the polyurethane prepolymer having terminal isocyanate groups. The excess of polyisocyanate is chosen so that the free isocyanate group content of the polyurethane prepolymer after all of the hydroxyl groups of the polyol have reacted is 0.1% to 15% by weight, preferably 0.5% to 5% by weight, based on the total polyurethane prepolymer.

The polyols used for prepolymer preparation are those such as are normally used in polyurethane chemistry. Besides hydroxyl-containing polyacrylates, polyesters, polycarbonates and polybutadienes there is particular interest in the polyoxyalkylene polyols, especially polyoxyethylene polyols, polyoxypropylene polyols and polyoxybutylene polyols, preferably polyoxyalkylene diols or triols. The molecular weight of the polyols is typically in the range of 250-30 000 g/mol, in particular 500-15 000 g/mol. Preference is given to using polyols having a molecular weight of 800-6000 g/mol. By "molecular weight" or "molar weight" is meant always, here and below, the molecular weight average $M_w$.

Preferred polyols are simple polyoxypropylene polyols and also what are called "EO-end capped" (ethylene oxide-end capped) polyoxypropylene polyols. The latter are special polyoxypropylene-polyoxyethylene polyols which are obtained, for example, by alkoxylating simple polyoxypropylene polyols with ethylene oxide, after polypropoxylation has been concluded, and which as a result contain primary hydroxyl groups.

Further preferred polyols are polyoxyalkylene polyols having a total degree of unsaturation of <0.04 meq/g, preferably <0.02 meq/g and more preferably <0.017 meq/g. In one preferred embodiment such polyoxyalkylene polyols have a molecular weight of 2000 to 30 000 g/mol.

These specific polyoxyalkylene polyols are reaction products of a starter molecule with alkylene oxides such as 1,2-propylene oxide or ethylene oxide, it being possible for the alkylene oxides to be used individually, in alternating succession or as mixtures. A polymerization catalyst normally used is a double metal cyanide complex, or DMC catalyst for short. Polyols of this kind are available commercially, for example, under the names Acclaim® and Arcol® from Bayer, Preminol® from Asahi Glass, Alcupol® from Repsol and Poly-L® from Arch Chemicals. As a result of the use of a DMC catalyst during their preparation, they have a very low degree of unsaturation. This means that the amount of polyoxypropylenes which carry a double bond at one chain end and an OH group as terminal groups at the other chain end (referred to as "monools") in these polyols is very low. Monools come about as a result of the isomerization of propylene oxide, during propoxylation, to form allyl alcohol, which results in the formation of allyl-terminated polyoxypropylenes. The degree of unsaturation is measured in accordance with ASTM D-2849-69, "Testing Urethane Foam Polyol Raw Materials", and is reported as milliequivalents of unsaturation per gram of polyol (meq/g). The total degree of unsaturation (meq/g) of these polyols corresponds to the monool content. From the average molecular weight (or else with the total OH content) and the total degree of unsaturation it is possible to calculate the average OH functionality of the polyol. Mixtures of the polyols stated may also be used.

In addition to these stated polyols it is possible to use low molecular weight compounds having two or more hydroxyl groups, such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrogenated bisphenol A, 1,1,1-trimethylolethane, 1,1,1-trimethylolpropane, glycerol and sugar alcohols and other polyfunctional alcohols, and also mixtures of the aforementioned hydroxyl-containing compounds, when preparing the polyurethane prepolymer.

For the preparation of the polyurethane prepolymer, polyisocyanates are used. Preferred polyisocyanates are diisocyanates. Examples that may be mentioned include the following isocyanates which are very well known in polyurethane chemistry: 2,4- and 2,6-tolylene diisocyanate (TDI) and any desired mixtures of these isomers, 4,4'-diphenylmethane diisocyanate (MDI), the positionally isomeric diphenylmethane diisocyanates, and also oligomers and polymers of these isocyanates, 1,3- and 1,4-phenylene diisocyanate, 1,6-hexamethylene diisocyanate, 2,2,4- and 2,4,4-trimethyl-1,6-hexamethylene diisocyanate, 1,12-dodecamethylene diisocyanate, cyclohexane 1,3- and 1,4-diisocyanate and any desired mixtures of those isomers, 1-isocyanato-3,3,5-trimethyl-5-isocyanatomethylcyclohexane (=isophorone diisocyanate or IPDI), perhydro-2,4'- and -4,4'-diphenylmethane diisocyanate, 1,3- and 1,4-tetramethylxylylene diisocyanate, and any desired mixtures of the aforementioned isocyanates.

The polyurethane composition further comprises at least one catalyst system which is obtainable from at least one bismuth compound and at least one aromatic nitrogen compound.

The aromatic nitrogen compound is preferably a compound having the formula A or B,

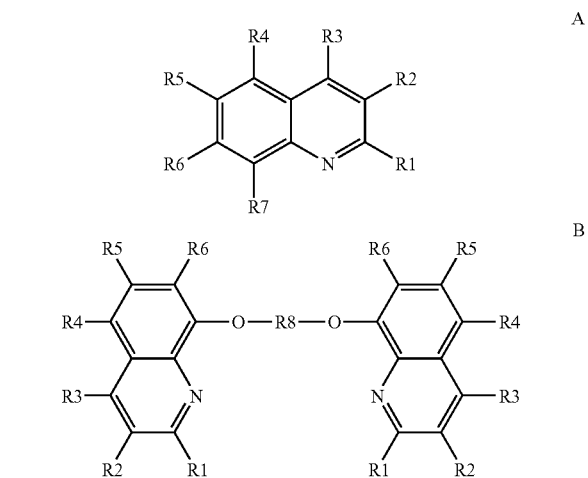

where R1, R2, R3, R4, R5 and R6 each independently of one another are H, methyl, ethyl, propyl, isopropyl, n-butyl, isobutyl, tert-butyl, $C_5$ to $C_{12}$ alkyl, COOH, COOR' or halogen. R7 is H, methyl, ethyl, $C_3$ to $C_{12}$ alkyl, OH or OR" and R8 is alkylene or alkylene ether. Finally, R' is an alkyl radical and R" is an alkyl radical or an alkyl radical containing heteroatoms.

Preferred R7 in the formula A is methyl, ethyl, $C_3$ to $C_8$ alkyl or O—(CH$_2$CH$_2$O)$_x$—R' or O—(CH$_2$CH(CH$_3$)O)$_x$—R' or positional isomers thereof, with the values for x of 1-6, or OH. Particularly preferred R7 is OH.

Preferred R8 in the formula B is $C_1$ to $C_8$ alkylene or (CH$_2$CH$_2$O)$_y$CH$_2$CH$_2$ or (CH$_2$CH(CH$_3$)O)$_y$CH$_2$CH(CH$_3$) or positional isomers thereof, with the values for y of 0-5. Particular preference is given here to values of y=2 or 3.

In the two formulae A or B preferred substituents R1, R2, R3, R4, R5 and R6 independently of one another are H or methyl. Particular preference is given to H.

A multiplicity of conventional bismuth catalysts may be used as the bismuth compound. These include, for example, bismuth carboxylates such as acetate, oleate, octoate or neodecanoate, for example, bismuth nitrate, bismuth halides such as bromide, chloride or iodide, for example, bismuth sulfide, basic bismuth carboxylates such as bismuthyl neodecanoate, bismuth subgallate or bismuth subsalicylate, for example, and also mixtures thereof. Preference is given to using bismuth carboxylates, particularly the tricarboxylates $Bi(OOC-R''')_3$, where $R'''$ is a $C_5$ to $C_{17}$ alkyl radical, especially $C_5$ to $C_{11}$ alkyl radical, preferably $C_7$ or $C_9$ alkyl radical. The bismuth carboxylates can be prepared by known processes starting, for example, from bismuth oxide.

The bismuth compound can be used in the form of a powder, a liquid or a solution.

The catalyst system is prepared by combining the bismuth compound and the aromatic nitrogen compound with one another. This combining can take place either in an inert medium such as a plasticizer or a solvent, or may take place directly in the polyurethane composition.

In one preferred embodiment, before its addition to the polyurethane composition, the catalyst system is prepared in an inert medium such as a plasticizer or a solvent, for example, by separately dissolving the bismuth compound and the aromatic nitrogen compound, for example, in a plasticizer or a solvent, for example, combining the solutions with one another and mixing them thoroughly. It is particularly advantageous to heat the mixture for a short time, for example at 50 to 120° C. for one hour.

It is generally necessary to ensure that when the aromatic nitrogen compound and the bismuth compound are being combined the components are mixed thoroughly. Special attention must also be paid to the method of metering bismuth compound and aromatic nitrogen compound.

The catalyst system described may comprise coordination compounds (complexes) in which the aromatic nitrogen compound is bonded coordinatively as a ligand to the bismuth atom. The formation of a complex in this way can be ascertained from a color change, in this case generally an intense yellow coloration, which may occur when the bismuth compound is mixed with the aromatic nitrogen compound. Color changes of this kind are known to the skilled worker and are regarded as an essential indicator of the formation of a complex.

The metering of the catalyst system is heavily dependent on the desired properties. Particular account should be taken here of, on the one hand, the amount of the aromatic nitrogen compound used for the catalyst system in relation to the bismuth compound, and, on the other hand, of the concentration of the catalyst system in the polyurethane composition.

With regard to the proportion of the aromatic nitrogen compound with respect to bismuth, the concept of "denticity", which is known from the theory of coordination (complex chemistry), must be taken into account. Certain functional groups of a ligand form a coordinative bond (complex bond) with a metal atom or metal ion. An aromatic nitrogen atom, for example, may be one such functional group. In one ligand, therefore, it is possible for there to be two or more such functional groups, identical or different, which are able to bond coordinatively to the metal atom. Ligands are consequently referred to as being "monodentate" (denticity =1), "bidentate" (denticity =2), "tridentate" (denticity =3), tetradentate (denticity =4), "polydentate" (multidentate) and so on, according to the number of their functional groups suitable for coordinative bonding with a specific metal atom. Thus in the present case, with bismuth as the metal atom, compounds of the formula A are considered to be monodentate, except in those cases where R7 is OH or OR'' and they are therefore bidentate, while compounds of the formula B are regarded as being tetradentate.

The described polyurethane compositions on the one hand have very good stability on storage, in the absence of water, and on the other hand, following their application, possess a high early strength and cure rapidly and fully.

With the aim of achieving rapid curing in conjunction with effective stability of the polyurethane compositions on storage, it has been found that the best results are achieved when the molar ratio of (aromatic nitrogen compound multiplied by its denticity) to bismuth is chosen in the range from 0.2:1 to 12:1. A small ratio, in the range of about 0.2:1 to 6:1, is to be preferred in this context, since with such a ratio a distinct stabilization of the composition is already achieved and at the same time the catalytic activity of the bismuth compound is essentially retained. (By the "catalytic activity" of a bismuth compound or a bismuth catalyst is meant, here and throughout the document, the catalytic action of the bismuth compound which based on its bismuth content (in % by weight) is directed to the reaction of the isocyanate groups.) In this case the catalyst system can be metered in amounts of 0.001 to 1.0% by weight bismuth, preferably 0.01 to 0.5% by weight bismuth, based on the weight of the total polyurethane composition.

If the ratio amounts to more than 6:1, which, assuming a coordination number of 6 for bismuth (octahedral coordination), corresponds to a ligand excess, there is only an insubstantial improvement in stabilization, while the catalytic activity increasingly decreases.

It should, however, be noted that the abovementioned decrease in catalytic activity, as a result of modifying the bismuth compound used with the aromatic nitrogen compound, affects only the rate of the curing reaction shortly after application. The decrease may possibly be attributable to the fact that the modified bismuth compound must first be activated by water and therefore to start with remains inactive, and attains its full catalytic activity only with time (an effect known as "delay" or "time lapse"; in the two-component compositions the consequence of this effect is an increase in the pot life). When this activation period has elapsed, the modified bismuth compound has the same catalytic activity as the unmodified compound and leads then to a rapid build-up of strength and to the rapid curing of the polyurethane composition. The slightly reduced catalytic activity to start with, as is observed for the catalyst system described, has no deleterious consequences, for the reasons mentioned, on the properties of the polyurethane composition of the invention; instead, on the contrary, it may even be desirable, since the processability period of the composition after application (known as the open time) is increased further by the viscosity rising only slowly at the beginning.

The polyurethane compositions described may also comprise other organometallic catalysts that are customary in polyurethane chemistry, as cocatalysts. A particularly advantageous combination is that of the catalyst system of the invention with tin compounds, such as tin(II) octoate, dibutyltin dilaurate or dibutyltin diacetate, for example, since the catalytic activity of such a mixture in the polyurethane composition is higher than that of the catalyst system of the invention alone. Moreover it is also possible to use other catalysts, familiar in polyurethane chemistry, as cocatalysts, examples being tertiary amines such as DABCO (=1,4-diazabicyclo[2.2.2]octane) or 2,2'-dimorpholinodiethyl ether. Admixing such catalysts may be advantageous for certain applications of polyurethane compositions.

Additional components that may be present in the polyurethane compositions described include, among others, the following auxiliaries and additives, well known in the polyurethane industry: plasticizers, examples being esters of organic carboxylic acids or their anhydrides, phthalates, such as dioctyl phthalate or diisodecyl phthalate, for example, adipates, such as dioctyl adipate, for example, sebacates, organic phosphoric and sulfonic esters, polybutenes and other non-isocyanate-reactive compounds; solvents; organic and inorganic fillers, such as ground or precipitated calcium carbonates, for example, optionally with a stearate coating, carbon blacks, kaolins, aluminas, silicas and PVC powders; fibers, of polyethylene for example; pigments; rheology modifiers such as thickeners, examples being urea compounds, polyamide waxes, bentonites or pyrogenic silicas; adhesion promoters, particularly silanes such as epoxysilanes, vinylsilanes, isocyanatosilanes and aminosilanes that have been reacted with aldehydes to form aldiminosilanes; drying agents such as, for example, p-tosylisocyanate and other reactive isocyanates, orthoformic esters, calcium oxide or molecular sieves; stabilizers with respect to heat, light and UV radiation; flame retardants; surface-active substances such as wetting agents, leveling agents, devolatilizers or defoamers, for example; fungicides or substances which inhibit fungal growth; and further substances customarily used in the polyurethane industry.

The polyurethane compositions described are prepared and kept in the absence of moisture. The compositions are stable on storage: that is, in suitable packaging or a suitable arrangement, such as in a drum, a pouch or a cartridge, for example, they can be kept prior to their application for several months up to one year or more without loosing their capacity for application. Upon application the polyurethane compositions come into contact with moisture, whereupon the isocyanate groups react with water and cure the polymer as a result. Either the water required for curing can come from the air (atmospheric moisture), or the polyurethane composition can be brought into contact with a water-containing component, such as by being brushed, for example, with a smoothing agent for example; by being sprayed, or by means of dipping methods, or else a water-containing component, in the form for example of a water-containing paste, which can be mixed in, for example, by a static mixer, can be added to the polyurethane composition.

The polyurethane composition described is suitable for use as a sealant of any kind, for the purpose for example of sealing joints in construction, as an adhesive for bonding diverse substrates, such as for bonding components in the production of automobiles, rail vehicles, ships or other industrial goods, for example, and also as a coating or lining for diverse articles and various substrates. Preferred coatings are protection coats, sealing systems, protective coatings, and primers. Among the linings, particular preference is given to floor coverings. Coverings of this kind are produced by, typically, pouring a reactive composition onto the substrate and leveling it, where it cures to form a floor covering. Floor coverings of this kind are used, for example, for offices, living areas, hospitals, schools, warehouses, garages and other private or industrial applications.

With particular preference the composition of the invention finds application as an adhesive or as a primer.

The polyurethane composition is contacted at least partly with the surface of any desired substrate. Preference is given to uniform contacting in the form of a sealant or adhesive, a coating or a lining, specifically in those regions which for the purpose of use require a bond in the form of an adhesive bond or seal or else whose substrate is to be covered over. It may well be necessary for the substrate and/or the article to be contacted to be subjected, as a preliminary to contacting, to a physical and/or chemical pretreatment, by means for example of abraiding, sandblasting, brushing or the like, or by treatment with cleaners, solvents, adhesion promoters, adhesion promoter solutions or primers, or the application of a tie coat or a sealer. Contacting is followed, as already mentioned, by curing under the influence of water.

It has been found that the polyurethane composition according to claim 1 is especially suitable as an adhesive or primer on painted surfaces, particularly where automotive paints are used, and especially in connection with multiply baked automotive paints.

Additionally claimed is a catalyst for polyurethane compositions which is a coordination compound (complex) between bismuth and an aromatic nitrogen compound of the formula A or B

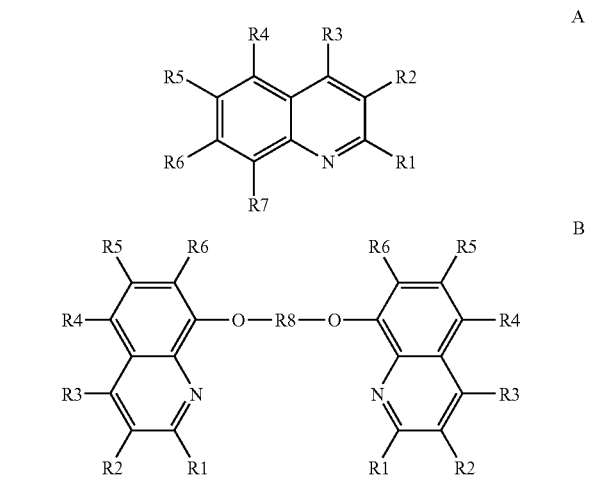

where R1, R2, R3, R4, R5 and R6 each independently of one another are H, methyl, ethyl, propyl, isopropyl, n-butyl, isobutyl, tert-butyl, $C_5$ to $C_{12}$ alkyl, COOH, COOR' or halogen. R7 is H, methyl, ethyl, $C_3$ to $C_{12}$ alkyl, OH or OR" and R8 is alkylene or alkylene ether. Finally, R' is an alkyl radical and R" is an alkyl radical or an alkyl radical containing heteroatoms.

Preferred R7 in the formula A is $C_1$ to $C_8$ alkyl or O—$(CH_2CH_2O)_x$—R' or O—$(CH_2CH(CH_3)O)_x$—R' or positional isomers thereof, with the values for x of 1-6, or OH. Particularly preferred R7 is OH.

Preferred R8 in the formula B is $C_1$ to $C_8$ alkylene or $(CH_2CH_2O)_y CH_2CH_2$ or $(CH_2CH(CH_3)O)_y CH_2CH(CH_3)$ or positional isomers thereof, with the values for y of 0-5. Particular preference is given here to values of y=2 or 3.

In the two formulae A or B preferred substituents R1, R2, R3, R4, R5 and R6 independently of one another are H or methyl. Particular preference is given to H.

A catalyst which has proven particularly suitable is a coordination compound between bismuth and 8-hydroxyquinoline or between bismuth and tetraethylene glycol bis(8-quinolyl) ether.

Surprisingly it has been found that the above-described catalyst can be used with advantage for preparing polyurethane prepolymers. In this case the reaction of at least one polyisocyanate with at least one polyol in the presence of at least one above-described catalyst is markedly accelerated but without this leading to increased problems with the storage stability of the prepolymers. Therefore, this results, on the one hand, in shorter preparation times for polyurethane prepolymers and, on the other hand, this polyurethane prepolymer, and the products formulated with it, can be stored for a longer time without any substantial increase in viscosity.

EXAMPLES

Examples 1-9 and Comparative Examples 10-26

Bismuth tris(neodecanoate) in neodecanoic acid (NeoBi 200, Shepherd Chemicals; bismuth content 20.0% by weight) and a compound L of denticity Z in the stated molar ratio L×Z/Bi according to Tables 1 and 2 were charged to a glass flask and diluted with diisodecyl phthalate to a total bismuth content of formally 2.0% by weight. The mixtures were placed under dry nitrogen and heated at 100° C. with vigorous stirring for one hour. The resulting catalyst solutions or suspensions were cooled and then mixed into an isocyanate-terminated polyurethane prepolymer, in an amount of 3.0% by weight (i.e., formally, 0.06% by weight of bismuth) per 100% by weight of prepolymer. The prepolymer used in this case was prepared as follows:

259 g of polyol Acclaim® 4200 N (Bayer), 517 g of polyol Caradol® MD34-02 (Shell) and 124 g of 4,4'-methylenediphenyl diisocyanate (MDI; Desmodur® 44 MC L, Bayer) were reacted by a known process at 80° C. to give an NCO-terminated prepolymer. The reaction product had a titrimetrically determined free isocyanate group content of 2.35% by weight and a viscosity at 20° C. of 84 Pa·s.

After the mixing operation the composition was introduced immediately into internally coated aluminum tubes, which were sealed tightly and stored in an oven at 60° C.

The mixture was tested first after one day and again after 7 days. Testing involved determinations of the skin formation time and the viscosity in each case.

The skin formation time was determined by applying the composition, which was at room temperature, to cardboard in a layer thickness of 3 mm, at 23° C. and approximately 50% relative humidity, and then determining the time which elapsed until the composition, when its surface was gently poked with an LDPE pipette, no longer left any residues of polymer on the pipette.

The viscosity was determined at 20° C. on a cone-and-plate viscometer from Physica. The minimum distance between cone and plate was 0.05 mm; measurement took place at a constant shear rate of 30 $s^{-1}$. The change in viscosity is a measure of the storage stability of a polyurethane composition.

The results of the tests performed are set out in Tables 1 and 2.

These results show that the inventive compositions of Examples 1 to 9 (each comprising an inventive bismuth catalyst system) (Table 1), when set against Comparative Example 10 (containing exclusively bismuth carboxylate as catalyst) (Table 2), all have a better storage stability and, depending on the aromatic compound L used, have a shorter to slightly higher skin formation time. The inherently unwanted increase, however, remains, with a maximum value of +8%, well within the range of what is tolerable.

TABLE 1

Inventive bismuth-catalyzed polyurethane compositions, stabilized with compound L: Effect of compound L on skin formation time and stability.

| Ex. | Compound L | Denticity (Z) of L | Ratio L × Z/Bi (mol/mol) | Skin formation time (min)[1] | Increase in viscosity (%)[2] |
|---|---|---|---|---|---|
| 1 | Tetraethylene glycol bis(8-quinolyl) ether | 4 | 6/1 | 47 | 53 |
| 2 | Imidazole | 1 | 6/1 | 64 | 75 |
| 3 | 2-Hydroxymethylpyridine | 2 | 6/1 | 69 | 85 |
| 4 | 2,2'-Bipyridyl | 2 | 6/1 | 72 | 104 |
| 5 | 5-Methylbenzimidazole | 2 | 6/1 | 74 | 88 |
| 6 | 3,5-Dimethylpyrazole | 1 | 6/1 | 76 | 77 |
| 7 | 8-Hydroxyquinoline (oxine) | 2 | 6/1 | 84 | 16 |
| 8 | 2-Methylquinoline (quinaldine) | 1 | 6/1 | 85 | 85 |
| 9 | Quinoline | 1 | 6/1 | 85 | 95 |

[1]Measurements for the composition stored for one day.
[2]Relative increase in viscosity of the composition stored for 7 days in relation to that of the composition stored for one day: [η(7d)/η(1d) − 1] × 100% and standardized to pure prepolymer.

TABLE 2

Comparative bismuth-catalyzed polyurethane compositions, stabilized with compound L: Effect of compound L on skin formation time and stability.

| Ex. | Compound L | Denticity (Z) of L | Ratio L × Z/Bi (mol/mol) | Skin formation time (min)[1] | Increase in viscosity (%)[2] |
|---|---|---|---|---|---|
| 10 | — | — | — | 79 | 121 |
| 11 | Zirconium tetrakis(2 ethylhexanoate) | | 6/1 | 35 | >500 |
| 12 | Pyrocatechol (catechol) | 2 | 6/1 | 54 | 400 |
| 13 | Salicylaldoxime | 2 | 6/1 | 58 | 265 |
| 14 | 2-Acetamidophenol[3] | 2 | 6/1 | 58 | 190 |
| 15 | Thiodiglycol bis(3-aminocrotonate) | 4 | 6/1 | 65 | 360 |
| 16 | Benzoylacetone | 2 | 6/1 | 66 | 165 |
| 17 | Triphenylphosphine | 1 | 6/1 | 69 | 126 |
| 18 | Glycine[3] | 2 | 6/1 | 73 | 131 |
| 19 | Acetylacetone | 2 | 6/1 | 73 | 360 |
| 20 | Triethyl phosphite | 1 | 6/1 | 77 | >500 |
| 21 | Ethyl acetoacetate | 2 | 6/1 | 84 | 162 |
| 22 | 2,5-Dimercapto-1,3,4-thiadiazole (bismuthiol I)[3] | 4 | 6/1 | 150 | 1 |

TABLE 2-continued

Comparative bismuth-catalyzed polyurethane compositions, stabilized with compound L:
Effect of compound L on skin formation time and stability.

| Ex. | Compound L | Denticity (Z) of L | Ratio L × Z/Bi (mol/mol) | Skin formation time (min)[1] | Increase in viscosity (%)[2] |
|---|---|---|---|---|---|
| 23 | Diphenyl phosphate | 1 | 6/1 | 160 | 26 |
| 24 | Toluene-4-sulfonyl isocyanate | 1 | 6/1 | 160 | 55 |
| 25 | 2-Mercaptobenzothiazole[3] | 2 | 6/1 | 360 | 4 |
| 26 | Thiourea[4] | 2 | 6/1 | n.m.[5] | n.m.[5] |

[1]Measurements for the composition stored for one day.
[2]Relative increase in viscosity of the composition stored for 7 days in relation to that of the composition stored for one day: $[\eta(7d)/\eta(1d) - 1] \times 100\%$ and standardized to pure prepolymer.
[3]Catalyst system is a suspension.
[4]Reduces bismuth (Bi-mirror on glass wall).
[5]n.m. = not measurable.

Comparative Examples 11 to 26 (comprising noninventive bismuth catalyst systems) (Table 2), on the other hand, when set against Comparative Example 10 (comprising exclusively bismuth carboxylate as catalyst), all bring no improvement or even perform distinctly poorer than said comparative example. Thus the compositions of Comparative Examples 11 to 21 exhibit skin formation times which are probably acceptable, but in terms of storage stability are no better or even markedly poorer than Comparative Example 10. Conversely, when set against Comparative Example 10, Comparative Examples 22 to 26 are probably more stable on storage but all possess a higher skin formation time, the increase, with values of +90% to +356%, lying well outside what is tolerable. The reactivity of these compositions therefore differs only slightly from that of the uncatalyzed composition.

Examples 27-35

Bismuth tris(neodecanoate) in neodecanoic acid (NeoBi 200, Shepherd Chemicals; bismuth content 20.0% by weight) and a compound L of denticity Z in the stated molar ratio L×Z/Bi according to Table 3 were charged to a glass flask and diluted with diisodecyl phthalate to a total bismuth content of formally 2.0% by weight. The mixture was placed under dry nitrogen and heated at 100° C. with vigorous stirring for one hour. The resulting catalyst solution was cooled and then mixed into the isocyanate-terminated polyurethane prepolymer described in Example 1, in an amount of 3.0% by weight (i.e., formally, 0.06% by weight of bismuth) per 100% by weight of prepolymer, and the mixtures were stored and tested as described in Example 1. The results of the tests performed are set out in Table 3.

The results in Table 3 show that the inventive compositions of Examples 7 and 27 to 35 (each comprising an inventive bismuth catalyst system), when set against Comparative Example 10 (comprising exclusively bismuth carboxylate as catalyst), all—that is, over the entire range of the ratio between compound L of denticity Z and bismuth (L×Z/Bi, mol/mol)—exhibit a better storage stability. Depending on the ratio employed, the stabilization effect is more or less pronounced: the higher the chosen ratio, the more stable the composition. Conversely, with a higher ratio, there is also an increase in the skin formation time. This increase, however, remains tolerable (+16%) even with the highest chosen ratio in Example 35. The pattern of properties that is the best overall (high stability, low skin formation time) is produced for ratios L×Z/Bi in the middle (6/1) to lower (0.2/1) range.

TABLE 3

Bismuth-catalyzed polyurethane compositions, stabilized with compound L: Effect of ratio L×Z/Bi on skin formation time and stability.

| Ex. | Compound L (Z = 2) | Ratio L × Z/Bi (mol/mol) | Skin formation time (min)[6] | Increase in viscosity (%)[7] |
|---|---|---|---|---|
| 10 | — | 0/1 | 79 | 121 |
| 27 | 8-Hydroxyquinoline | 0.2/1 | 80 | 80 |
| 28 | 8-Hydroxyquinoline | 0.5/1 | 80 | 67 |
| 29 | 8-Hydroxyquinoline | 1.0/1 | 80 | 50 |
| 30 | 8-Hydroxyquinoline | 1.5/1 | 81 | 44 |
| 31 | 8-Hydroxyquinoline | 2/1 | 82 | 37 |
| 32 | 8-Hydroxyquinoline | 4/1 | 83 | 19 |
| 7 | 8-Hydroxyquinoline | 6/1 | 84 | 16 |
| 33 | 8-Hydroxyquinoline | 8/1 | 87 | 16 |
| 34 | 8-Hydroxyquinoline | 10/1 | 92 | 13 |
| 35 | 8-Hydroxyquinoline | 12/1 | 92 | 13 |

[6]Measurements for the composition stored for one day.
[7]Relative increase in viscosity of the composition stored for 7 days to that of the composition stored for one day: $[\eta(7d)/\eta(1d) - 1] \times 100\%$ and standardized to pure prepolymer.

Examples 36-38 and Comparative Example 39

3 parts by weight of bismuth tris(neodecanoate) in neodecanoic acid (NeoBi 200, Shepherd Chemicals; bismuth content 20.0% by weight) and 1 part by weight of dibutyltin dilaurate (DBTDL; Metatin® catalyst 712, Acima/Rohm & Haas; tin content 18.5% by weight) together with a compound L of denticity Z in the stated molar ratio L×Z/(Bi+Sn) according to Table 4 were charged to a glass flask and diluted with diisodecyl phthalate to a total bismuth content of formally 1.0% by weight (or 0.31% by weight of tin). The mixtures were placed under dry nitrogen and heated at 100° C. with vigorous stirring for one hour. The resulting catalyst solutions were cooled and then mixed into the isocyanate-terminated polyurethane prepolymer described in Example 1, in an amount of 3.0% by weight (i.e., formally 0.03% by weight of bismuth and 0.01% by weight of tin) per 100% by weight of prepolymer, and the mixtures were stored and tested as described in Example 1. The results of the tests performed are set out in Table 4.

TABLE 4

Bismuth/tin-catalyzed polyurethane compositions, stabilized with compound L: Effect of the tin cocatalyst.

| Ex. | Compound L (Z = 2) | Ratio L × Z/ (Bi + Sn) (mol/mol) | Skin formation time (min)[8] | Increase in viscosity (%)[9] |
|---|---|---|---|---|
| 36 | 8-Hydroxyquinoline | 6/1 | 46 | 14 |
| 37 | 8-Hydroxyquinoline | 2/1 | 45 | 40 |
| 38 | 8-Hydroxyquinoline | 1/1 | 42 | 68 |
| 39 | — | 0/1 | 40 | 105 |

[8]Measurements for the composition stored for one day.
[9]Relative increase in viscosity of the composition stored for 7 days to that of the composition stored for one day: [η(7d)/η(1d) − 1] × 100% and standardized to pure prepolymer.

From the results in Table 4 it is apparent that the inventive compositions of Examples 36 to 38 (each comprising an inventive bismuth catalyst system combined with a tin cocatalyst), both when set against Examples 7, 29 and 31 (each comprising an inventive bismuth catalyst system without tin cocatalyst) and when set against Comparative Example 10 (comprising exclusively bismuth carboxylate as catalyst, without tin cocatalyst), in each case exhibit much lower skin formation times. The storage stability of the compositions is roughly of equal quality to that of the tin-free compositions. Comparative Example 39, which contains tin and bismuth but no aromatic nitrogen compound, has a much quicker skin formation time than Comparative Example 10, but possesses a deficit storage stability.

Examples 36 to 38 therefore show that the inventive compositions and, respectively, the inventive bismuth catalyst system can be combined advantageously with a tin catalyst.

Example 40 and Comparative Examples 41-43

This example demonstrates the preparation of an inventive polyurethane composition and its use as an adhesive.

In a vacuum mixer, 1500 g of prepolymer 1, 250 g of prepolymer 2, 1000 g of kaolin, 625 g of carbon black, 500 g of diisodecyl phthalate (DIDP; Palatinol® Z, BASF), 1000 g of urea thickener, 25 g of 3-glycidyloxypropyltrimethoxysilane (Silquest® A-187, OSi Crompton) and 100 g of one of the catalyst solutions 1 to 4 according to Table 5 were processed to a lump-free, homogeneous paste.

Prepolymers 1 and 2 were prepared as follows:

Prepolymer 1: 2155 g of polyol Acclaim® 4200 N (Bayer), 4310 g of polyol Caradol® MD34-02 (Shell) and 1035 g of 4,4'-methylenediphenyl diisocyanate (MDI; Desmodur® 44 MC L, Bayer) were reacted by a known method at 80° C. to give an NCO-terminated prepolymer. The reaction product had a titrimetrically determined free isocyanate group content of 2.36% by weight.

Prepolymer 2: 590 g of polyol Acclaim® 4200 N (Bayer), 1180 g of polyol Caradol® MD34-02 (Shell) and 230 g of isophorone diisocyanate (IPDI; Vestanat® IPDI, Degussa) were reacted by a known method at 80° C. to give an NCO-terminated prepolymer. The reaction product had a titrimetrically determined free isocyanate group content of 2.12% by weight.

The urea thickener was prepared as follows:

A vacuum mixer was charged with 1000 g of diisodecyl phthalate (DIDP; Palatinol® Z, BASF) and 160 g of 4,4'-methylenediphenyl diisocyanate (MDI; Desmodur® 44 MC L, Bayer) and this initial charge was warmed up slightly. Then 90 g of monobutylamine were added slowly dropwise with vigorous stirring. The resulting paste was stirred further for one hour under vacuum and with cooling.

Catalyst solutions 1 to 4 were prepared as follows:

Catalyst solution 1: bismuth tris(neodecanoate) in neodecanoic acid (NeoBi 200, Shepherd Chemicals; bismuth content 20.0% by weight) and a solution of 8-hydroxyquinoline (denticity Z=2) in diisodecyl phthalate (DIDP) were charged in a molar ratio L×Z/Bi of 1.5/1 to a glass flask and diluted with DIDP to a total bismuth content of formally 5.85% by weight. The mixture was heated at 80° C. for one hour with vigorous stirring and then cooled to room temperature.

Catalyst solution 2: bismuth tris(neodecanoate) in neodecanoic acid (NeoBi 200, Shepherd Chemicals; bismuth content 20.0% by weight) was charged to a glass flask and diluted with DIDP to a total bismuth content of formally 5.85% by weight.

Catalyst solution 3: bismuth tris(neodecanoate) in neodecanoic acid (NeoBi 200, Shepherd Chemicals; bismuth content 20.0% by weight) and a solution of toluene-4-sulfonyl isocyanate (denticity Z=1) in diisodecyl phthalate (DIDP) were charged in a molar ratio L×Z/Bi of 3/1 to a glass flask and diluted with DIDP to a total bismuth content of formally 5.85% by weight.

Catalyst solution 4: 10 g of 2,2'-dimorpholinodiethyl ether (DMDEE) and 1 g of dibutyltin dilaurate (DBTDL; Metatin® Catalyst 712, Acima/Rohm & Haas; tin content 18.5% by weight) were combined with 89 g of DIDP and mixed to a homogeneous solution.

Immediately after the preparation of the resultant adhesives they were dispensed into aluminum cartridges having a diameter of 45 mm, which were given an airtight seal and stored in an oven at 60° C. After a day the adhesives were tested for extrusion force, skin formation time, early strength and adhesion properties. After 7 days the extrusion force was measured again.

The extrusion force (ETF) was determined in each case on a freshly opened cartridge at room temperature, the adhesive being extruded at room temperature from the tip of the cartridge through an opening of 5 mm. Extrusion took place by means of a tensile testing machine at a constant speed of 60 mm/min.

The skin formation time (SFT) was determined as described in Example 1.

The early strength was determined as follows. First two small glass plates measuring 40×100×6 mm were pretreated with Sika® activator (available from Sika Schweiz AG) on the side where bonding was to take place. After an evaporation time of 10 minutes, the adhesive was applied to one glass plate, as a triangular bead along the long edge. After about a minute the adhesive was compressed to a thickness of 4 mm (corresponding to a bond width of about 1 cm) using the second glass plate and a tensile machine (Zwick), then stored for 90 minutes at 23° C. and 50% relative humidity and subsequently pulled apart with a tensile speed of 100 mm/min, the maximum force required for this purpose being recorded, in N/cm².

The results of the tests performed are set out in Table 5.

TABLE 5

Properties of the polyurethane compositions

| Example | Catalyst solution | ETF fresh[10] (N) | ETF stored[11] (N) | SFT[12] (min) | Early strength[13] (N/cm²) |
|---|---|---|---|---|---|
| 40 | 1 | 632 | 779 | 25 | 20 |
| 41 | 2 | 912 | >2000 | 15 | 21 |

TABLE 5-continued

Properties of the polyurethane compositions

| Example | Catalyst solution | ETF fresh[10] (N) | ETF stored[11] (N) | SFT[12] SFT[12] (min) | Early strength[13] (N/cm$^2$) |
|---|---|---|---|---|---|
| 42 | 3 | 615 | 643 | 36 | 8 |
| 43 | 4 | 689 | 784 | 17 | 22 |

[10]Extrusion force after storage at 60° C. for one day.
[11]Extrusion force after storage at 60° C. for 7 days.
[12]Skin formation time.
[13]After 90 minutes.

For the adhesion tests the substrate was precleaned with isopropanol and after an evaporation time of 30 seconds the adhesive was applied from the aluminum cartridge in the form of a triangular bead.

After 7 days of storage at room temperature and 50% relative humidity (indicated as RT in Table 6) and a further 7 days at 40° C. and 100% relative humidity (indicated as CC (condensation conditions) in Table 6) the adhesion was tested by means of the "bead test". In this test an incision is made at the end just above the adhesion face. The incised end of the bead is held with round-end tweezers and pulled from the substrate. This is done by carefully rolling up the bead on the tip of the tweezers, and placing a cut vertical to the bead-drawing direction down to the bare substrate. The rate of removal of the bead is to be chosen such that a cut has to be made about every 3 seconds (cut spacing about 2 to 3 mm). The test length must amount to at least 8 cm. The adhesion properties are evaluated on the basis of the adhesive which remains after the bead has been removed from the substrate (cohesive fracture), specifically by estimating the cohesive proportion of the adhesion face, in accordance with the following scale:

1=>95% cohesive fracture
2=75% -95% cohesive fracture
3=25% -75% cohesive fracture
4=<25% cohesive fracture
5=adhesive fracture The addition of a "P" indicates that the primer detaches from the substrate, and therefore the adhesion of the primer on the substrate represents a weak point. Test results with cohesive fracture values of less than 75% are regarded as being inadequate.

The results of the tests performed are set out in Table 6.

TABLE 6

Adhesion of the polyurethane compositions to steel panels coated with automotive paints

| | | 2K PU Clearcoat | | Acrylate powder clearcoat | |
|---|---|---|---|---|---|
| Firing[14] | Storage | 1x | 5x | 1x | 5x |
| Example 40 | RT | 1 | 1 | 1 | 1 |
| | CC | 1 | 1 | 1 | 1 |
| Example 41 | RT | 1 | 1 | 1 | 1 |
| | CC | 1 | 1 | 1 | 1 |
| Example 42 | RT | 1 | 1 | 1 | 1 |
| | CC | 1 | 1 | 1 | 1 |

TABLE 6-continued

Adhesion of the polyurethane compositions to steel panels coated with automotive paints

| | | 2K PU Clearcoat | | Acrylate powder clearcoat | |
|---|---|---|---|---|---|
| Firing[14] | Storage | 1x | 5x | 1x | 5x |
| Example 43 | RT | 1 | 4 | 4 | 4 |
| | CC | 1 | 4 | 4 | 4 |

[14]Number of firing cycles of the paint (in each case 20 min at 135° C. per firing cycle)

The results in Table 5 and Table 6 show that the inventive polyurethane composition of Example 40 has properties suitable for use as an adhesive, namely an excellent storage stability (visible from the small difference between extrusion force fresh and extrusion force stored), a high early strength, and also good adhesion properties on new-generation automotive paints, including, in particular, in the event of multiple firing. Furthermore, the somewhat higher skin formation time tends to allow the adhesive to be processed for a longer time after application. The adhesion compositions of Comparative Examples 41 to 43 (comprising noninventive bismuth catalyst systems) all have weaknesses when set against Example 40. The composition of Comparative Example 41 (comprising exclusively bismuth carboxylate as catalyst) indeed has a high early strength and possesses good adhesion properties; however, it lacks sufficient stability on storage. The composition of Comparative Example 42 (comprising a catalyst system composed of bismuth carboxylate and toluene-4-sulfonyl isocyanate) is stable on storage and possesses good adhesion properties; however, it cures much too slowly and therefore has a low early strength. The composition of Comparative Example 43 (comprising a tertiary amine as catalyst), finally, is stable on storage and has a high early strength; its adhesion properties, in contrast, are inadequate.

Example 44 and Comparative Examples 45-46

This example demonstrates the preparation of an inventive polyurethane composition and its use as a primer.

The polyurethane primer Sika® Primer-209 (available commercially from Sika Schweiz AG), which comprises a polyurethane prepolymer, was admixed with a catalyst system according to Table 7, which was mixed in thoroughly under nitrogen, and the mixture was applied by brush to a metal panel which had been cleaned with isohexane and coated with a multiply baked automotive paint. After an evaporation time of 30 minutes, SikaTack®-Plus HM (available commercially from Sika Schweiz AG), a high-modulus moisture-curing polyurethane adhesive, which was preheated to 80° C., was applied by means of cartridge. The adhesion of the adhesive was tested after storage at room temperature and 50% relative humidity.

The storage stability of the examples in Table 7 was assessed by the increase in viscosity after 30 days of storage at room temperature or at 50° C., in direct comparison to Sika® Primer-209.

TABLE 7

Adhesion of polyurethane primers to steel panels coated with automotive paints (2K PU clearcoat, baked at 150° C. 5x for 20 minutes each)

| Example | Catalyst system added | Adhesion | Storage stability RT | 50° C. |
|---|---|---|---|---|
| 44 | 0.5% by weight[15] NeoBi 200[16] and 0.025% by weight[15] 8-hydroxyquinoline | 1 | Good | Good |
| 45 | 0.5% by weight[15] NeoBi 200[16] | 1 | Poor | Poor |
| 46 | — | 5P-4P | Good | Good |

[15]Based on Sika ® Primer-209.
[16]NeoBi 200 = bismuth tris(neodecanoate) in neodecanoic acid (Shepherd Chemicals; bismuth content 20.0% by weight).

The results of Table 7 show that the inventive polyurethane composition of Example 44 has properties suitable for application as a primer, namely both good adhesion to automotive paints and good storage stability. The primer compositions of Comparative Examples 45 and 46, in contrast, have weaknesses when set against Example 44: the composition of Comparative Example 45 (addition of bismuth carboxylate as catalyst) indeed has good adhesion properties on automotive paints but lacks sufficient stability on storage; the composition of Comparative Example 46 (no catalyst added) is indeed stable on storage, but has inadequate adhesion properties to the new generation of automotive paints.

The invention claimed is:

1. A one-part polyurethane prepolymer composition comprising, in a single part,
    at least one polyurethane prepolymer having terminal isocyanate groups, prepared from at least one polyisocyanate with at least one polyol; and
    at least one catalyst system obtained from components consisting of one bismuth compound and one aromatic nitrogen compound, wherein the aromatic nitrogen compound is coordinatively bonded with bismuth, and the aromatic nitrogen compound has the formula A or B,

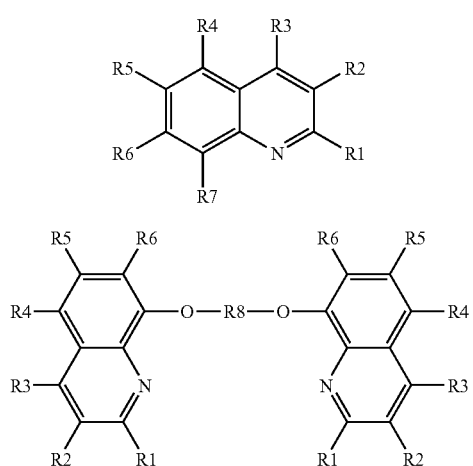

where:
R1, R2, R3, R4, R5 and R6 each independently of one another is H, methyl, ethyl, propyl, isopropyl, n-butyl, isobutyl, tert-butyl, $C_5$ to $C_{12}$ alkyl, COOH, COOR' or halogen, R7 is a $C_1$ to $C_8$ alkyl, a hydroxyl group (OH), O—$(CH_2CH_2O)_x$—R' with the values for x of 1-6, or O—$(CH_2CH(CH_3)O)_x$—R' or a positional isomer thereof, with the values for x of 1-6, R8 is alkylene or alkylene ether, R' is alkyl, and R" is alkyl or alkyl with heteroatoms.

2. The one-part polyurethane prepolymer composition of claim 1, wherein the aromatic nitrogen compound is the aromatic nitrogen compound of formula B, and wherein R8 is a $C_1$ to $C_8$ alkylene, $(CH_2CH_2O)_yCH_2CH_2$, $(CH_2CH(CH_3)O)_y CH_2CH(CH_3)$ or a positional isomer thereof, with the values for y of 0-5.

3. The one-part polyurethane prepolymer composition of claim 1, wherein, in the aromatic nitrogen compound of formula A or B, the substituents R1, R2, R3, R4, R5 and R6 each independently of one another is H or methyl.

4. The one-part polyurethane prepolymer composition of claim 1, wherein the bismuth compound is a bismuth carboxylate Bi(OOC—R''')$_3$, where R''' is a $C_5$ to $C_{17}$ alkyl radical.

5. The one-part polyurethane prepolymer composition of claim 1, wherein in the catalyst system a molar ratio of (aromatic nitrogen compound multiplied by the denticity of the aromatic nitrogen compound) to bismuth is 0.2:1 to 12:1.

6. The one-part polyurethane prepolymer composition of claim 1, wherein there is also at least one tin compound present.

7. The one-part polyurethane prepolymer composition of claim 1, wherein the composition is moisture-curing.

8. A process for preparing the one-part polyurethane prepolymer composition of claim 1, comprising a step of preparing the catalyst system by reacting a bismuth compound with at least one aromatic nitrogen compound.

9. An adhesive, sealant, coating or lining comprising the one-part polyurethane prepolymer composition of claim 1.

10. A primer comprising the one-part polyurethane prepolymer composition of claim 1.

11. A method of adhesively bonding, sealing or coating a surface, comprising contacting the surface with the one-part polyurethane prepolymer composition of claim 1.

12. The method of claim 11, wherein the surface is a paint.

13. The method of claim 11, further comprising curing the contacted surface in air.

14. The method of claim 11, further comprising contacting the surface with a water-containing component or an admixture thereof.

15. A catalyst for polyurethane compositions, wherein the catalyst is a coordination compound between bismuth and an aromatic nitrogen compound of the formula A or B,

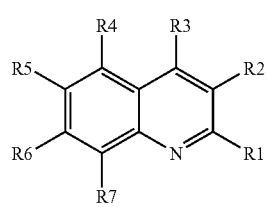

-continued

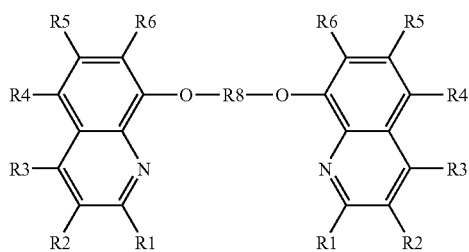

where
R1, R2, R3, R4, R5 and R6 each independently of one another is H, methyl, ethyl, propyl, isopropyl, n-butyl, isobutyl, tert-butyl, $C_5$ to $C_{12}$ alkyl, COOH, COOR' or halogen,
R7 is a $C_1$ to $C_8$ alkyl, a hydroxyl group (OH), O—$(CH_2CH_2O)_x$—R' with the values for x of 1-6, or O—$(CH_2CH(CH_3)O)_x$—R' or a positional isomer thereof, with the values for x of 1-6,
R8 is alkylene or alkylene ether,
R' is alkyl, and
R" is alkyl or alkyl with heteroatoms.

16. A catalyst for polyurethane compositions, wherein the catalyst is a coordination compound between bismuth and 8-hydroxyquinoline or between bismuth and tetraethylene glycol bis(8-quinolyl) ether.

17. A process for preparing a polyurethane prepolymer, comprising catalyzing a reaction of at least one polyisocyanate with at least one polyol with a catalyst of claim 15.

18. The one-part polyurethane prepolymer composition of claim 1, wherein R7 is OH.

19. A one-part polyurethane prepolymer composition comprising, in a single part,
at least one polyurethane prepolymer having terminal isocyanate groups, prepared from at least one polyisocyanate with at least one polyol; and
a catalyst system consisting of a catalyst obtained from components consisting of one bismuth compound and one aromatic nitrogen compound, wherein the aromatic nitrogen compound has the formula A or B,

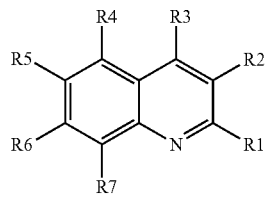

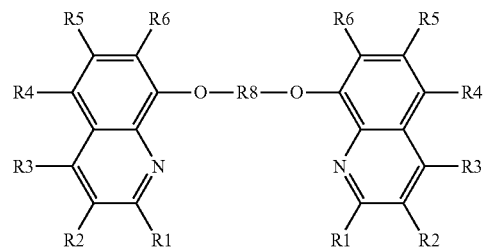

where:
R1, R2, R3, R4, R5 and R6 each independently of one another is H, methyl, ethyl, propyl, isopropyl, n-butyl, isobutyl, tert-butyl, $C_5$ to $C_{12}$ alkyl, COOH, COOR' or halogen,
R7 is a $C_1$ to $C_8$ alkyl, O—$(CH_2CH_2O)_x$—R' with the values for x of 1-6, or O—$(CH_2CH(CH_3)O)_x$—R' or a positional isomer thereof, with the values for x of 1-6,
R8 is alkylene or alkylene ether,
R' is alkyl, and
R" is alkyl or alkyl with heteroatoms.

* * * * *

UNITED STATES PATENT AND TRADEMARK OFFICE
CERTIFICATE OF CORRECTION

| | | |
|---|---|---|
| PATENT NO. | : 8,299,201 B2 | Page 1 of 1 |
| APPLICATION NO. | : 10/529894 | |
| DATED | : October 30, 2012 | |
| INVENTOR(S) | : Burckhardt et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 802 days.

Signed and Sealed this
Twenty-sixth Day of August, 2014

Michelle K. Lee
*Deputy Director of the United States Patent and Trademark Office*